United States Patent
Tsukamoto et al.

(10) Patent No.: US 7,173,098 B2
(45) Date of Patent: Feb. 6, 2007

(54) PROCESS FOR PRODUCING FLUOROPOLYMER

(75) Inventors: Mitsuo Tsukamoto, Settsu (JP); Kenji Otoi, Settsu (JP); Hideki Nakaya, Settsu (JP); Yoshiyuki Hiraga, Settsu (JP); Tomohisa Noda, Settsu (JP)

(73) Assignee: Daikin Industries, Ltd., Osaka (JP)

(*) Notice: Subject to any disclaimer, the term of this patent is extended or adjusted under 35 U.S.C. 154(b) by 72 days.

(21) Appl. No.: 10/495,225

(22) PCT Filed: Nov. 1, 2002

(86) PCT No.: PCT/JP02/11416
§ 371 (c)(1),
(2), (4) Date: May 11, 2004

(87) PCT Pub. No.: WO03/042252
PCT Pub. Date: May 22, 2003

(65) Prior Publication Data
US 2005/0043498 A1 Feb. 24, 2005

(30) Foreign Application Priority Data
Nov. 12, 2001 (JP) .............................. 2001-346341

(51) Int. Cl.
*C08F 4/28* (2006.01)
(52) U.S. Cl. .................. 526/249; 526/89; 526/227; 526/250; 526/253
(58) Field of Classification Search .............. 526/249, 526/250, 253, 227, 89
See application file for complete search history.

(56) References Cited

U.S. PATENT DOCUMENTS

| | | | | |
|---|---|---|---|---|
| 3,062,793 A | * | 11/1962 | Eleuterio | 526/135 |
| 5,312,882 A | * | 5/1994 | DeSimone et al. | 526/201 |
| 5,527,865 A | * | 6/1996 | DeSimone et al. | 526/89 |
| 5,618,894 A | * | 4/1997 | DeSimone et al. | 526/89 |
| 6,670,402 B1 | * | 12/2003 | Lee et al. | 516/111 |
| 6,723,812 B2 | | 4/2004 | Senninger | |

FOREIGN PATENT DOCUMENTS

| | | |
|---|---|---|
| EP | 1 191 042 A1 | 3/2002 |
| JP | 52-134696 | 11/1977 |
| JP | 52-134696 A | 11/1977 |
| JP | 53-149291 | 12/1978 |
| JP | 53-149291 A | 12/1978 |

(Continued)

OTHER PUBLICATIONS

International Search Report for PCT/JP02/11416 dated Jan. 28, 2003.

*Primary Examiner*—David W. Wu
*Assistant Examiner*—Henry S. Hu
(74) *Attorney, Agent, or Firm*—Sughrue Mion, PLLC

(57) ABSTRACT

The present invention has for its object to provide a method of producing fluoropolymers with high productivity under comparatively low temperature and low pressure conditions which are conducive to reduced cost of commercial-scale production equipment. The present invention is directed to a method of producing a fluoropolymer which comprises polymerizing a radical polymerizable monomer in a defined reaction-field, said radical polymerizable monomer comprising a fluorine-containing ethylenic monomer and said defined reaction-field being in supercriticality-expression state with a monomer density $[\rho_m]$-monomer critical density $[\rho_0]$ ratio of $[\rho_m/\rho_0]$ not less than 1.1.

7 Claims, 1 Drawing Sheet

FOREIGN PATENT DOCUMENTS

| | | |
|---|---|---|
| JP | 7-505429 | 6/1995 |
| JP | 10-502691 | 3/1998 |
| JP | 10-110017 | 4/1998 |
| JP | 10-110017 A | 4/1998 |
| JP | 11-501685 | 2/1999 |
| JP | 11-501685 A | 2/1999 |
| WO | WO 93/20116 | 10/1993 |
| WO | WO 96/01851 | 1/1996 |
| WO | WO 96/24624 | 8/1996 |
| WO | WO 00/47641 | 8/2000 |
| WO | WO 00/47641 A | 8/2000 |
| WO | WO 01/34667 A1 | 5/2001 |

\* cited by examiner

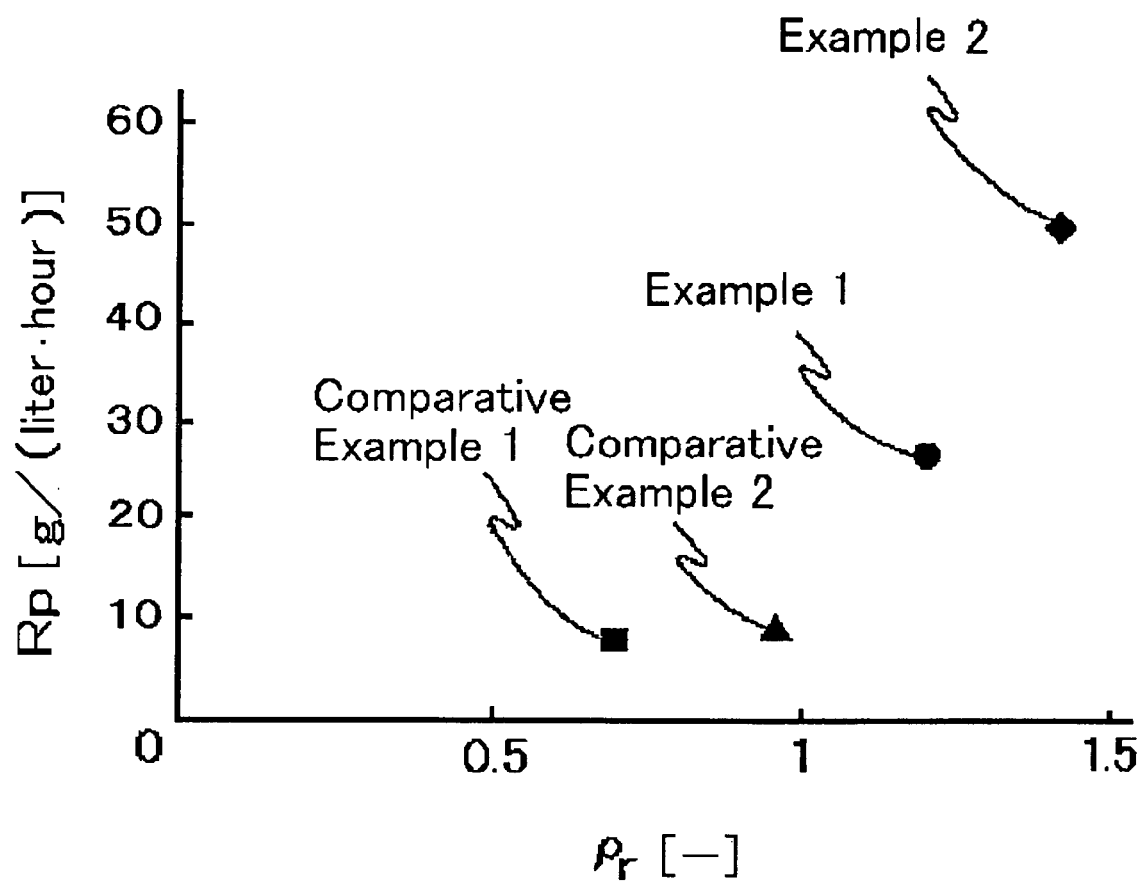

PROCESS FOR PRODUCING FLUOROPOLYMER

TECHNICAL FIELD

The present invention relates to a method of producing fluoropolymers. More particularly, the invention relates to a method of producing a fluoropolymer which comprises conducting a radical polymerization using, as a polymerization medium, a fluorine-containing ethylenic monomer having a monomer density in a supercriticality-expression state not lower than the monomer critical density thereof.

BACKGROUND TECHNOLOGY

Fluoropolymers display outstanding chemical resistance, solvent resistance, and heat resistance, among other properties, and, therefore, are in use in a great diversity of industrial fields, such as automotive industry, semiconductor industry, chemical industry, etc. as raw materials for sealants to be used under rugged conditions.

Production of fluoropolymers has heretofore been carried out mostly by emulsion polymerization of a fluoroolefin monomer using a water-soluble radical initiator in an aqueous medium or suspension polymerization of a fluoroolefin monomer using an oil-soluble radical initiator. In these polymerization, the reaction field is substantially situated in inside of the polymer particles being produced or in an inert solvent which does not materially affect the polymerization.

The conventional emulsion polymerization using an aqueous medium is generally carried out in the presence of a water-soluble initiator. Owing to this water-soluble initiator, the terminal groups of the polymer produced are rendered ionic and heat-labile, with the consequence that foaming and other troubles are liable to occur in the molding stage. The conventional emulsion polymerization method includes a step in which the aqueous dispersion obtained thereby is subjected to coagulation using an appropriate coagulating agent and to drying to remove water and then recover a solid polymer, therefore the method has another problem that it involves a time-consuming, complicated production sequence which impedes efficient production. Residues of the ionic initiator having run into the product obtained has been another problem in the use of moldings as mechanical parts of semiconductor production equipment.

The suspension polymerization method has the drawback that deposits of the product polymer adhere to the inside wall of the reactor vessel to reduce the polymer yield and add to the cost of polymer production. Furthermore, the suspension polymerization has a further problem: namely the process involves a time-consuming cleaning step for removing the suspension stabilizer used for the polymerization.

Recently much research has been undertaken on the use of a supercritical fluid, chiefly carbon dioxide, as a reaction field. Supercritical fluids feature good heat conductivities, high diffusion rates and low viscosities, thus having characteristics suitable for use as the reaction medium. The supercritical fluid is a fluid within the region transcending both of critical temperature and critical pressure, and generally for economic reasons, a range not transcending the critical point too far tends to be used with preference.

By way of polymerization of fluoroolefin monomers using a supercritical fluid as a reaction field, the specification of JP Kohyo H07-505429, for instance, discloses the radical polymerization of a fluoroacrylate using supercritical carbon dioxide as the reaction field. Moreover, the specification of U.S. Pat. No. 5,312,882 discloses a polymerization, in the presence of a surfactant containing a moiety having an affinity for carbon dioxide, using supercritical carbon dioxide as a continuous phase and a fluoroolefin monomer as a dispersed phase. The specification of U.S. Pat. No. 5,527,865 discloses a radical polymerization of tetrafluoroethylene in a biphasic nonhomogeneous system involving the concurrent use of water and supercritical carbon dioxide in the presence of a fluorine-containing anionic surfactant. Furthermore, the specification of U.S. Pat. No. 5,618,894 describes a technology for the homopolymerization of tetrafluoroethylene, copolymerization of tetrafluoroethylene/perfluoro(propyl vinyl ether), and copolymerization of vinylidene fluoride/hexafluoropropylene, wherein the reaction is conducted under anhydrous conditions using a radical polymerization initiator capable of generating a stable polymer-end-group in supercritical carbon dioxide. In these technologies, the supercritical fluid is invariably restricted to carbon dioxide or a carbon-dioxide-containing mixture. The specification of JP Kohyo H10-502691 discloses the reaction using carbon dioxide, hydrofluorocarbon, perfluorocarbon, or a mixture thereof in the form of a liquid maintained at supraatmospheric pressure or a supercritical fluid. However, the reaction field for this reaction requires an auxiliary dispersing agent as an indispensable component but this requirement is unfavorable from the standpoint of increasing the purity of the product polymer and, moreover, it is not that the reaction substrate fluoroolefin monomer itself is in the form of a supercritical fluid.

As examples of the polymerization of a fluoroolefin monomer which was carried out by transforming the very fluoroolefin monomer into a supercritical fluid and using it as a reaction field are the copolymerization of tetrafluoroethylene/hexafluoropropylene as described in the specification of U.S. Pat. No. 3,062,793, the copolymerization of tetrafluoroethylene/hexafluoropropylene and the copolymerization of vinylidene fluoride/hexafluoropropylene as described in the pamphlet of WO 96/24624. However, the former specification contains no description about VdF and the reaction condition disclosed there is not below about 200 MPa. The reaction conditions mentioned in the latter specification are very rugged high-temperature, high pressure conditions, namely a pressure somewhere between 41 and 690 MPa and a temperature somewhere between 200 and 400° C., with the result that the technology has the drawback of large capital expenditures needed for commercial-scale production.

As the polymerization of a supercritical fluoroolefin monomer at comparatively low temperature and low pressure, the pamphlet of WO 00/47641 discloses the copolymerization of vinylidene fluoride and hexafluoropropylene. However, this pamphlet contains no reference to polymerization at critical-to-supracritical density.

SUMMARY OF THE INVENTION

Taking note of the above state of the art and purporting to solve the problems of the prior art, the present invention has for its object to provide a method of producing fluoropolymers with high productivity under comparatively low temperature and low pressure conditions which are conducive to reduced cost of commercial-scale production equipment.

The present invention is directed to a method of producing a fluoropolymer which comprises polymerizing a radical polymerizable monomer in a defined reaction-field, said radical-polymerizable monomer comprising a fluorine-containing ethylenic monomer and said defined reaction-field being in supercriticality-expression state with a monomer density $[\rho_m]$–monomer critical density $[\rho_0]$ ratio of $[\rho_m/\rho_0]$ not less than 1.1.

BRIEF DESCRIPTION OF THE DRAWING

FIG. 1 is a diagrammatic representation of the relationship of the monomer density-monomer critical density ratio $[\rho_r]$ to the average polymerization rate $[R_p]$.

DISCLOSURE OF THE INVENTION

The present invention is now described in detail.

The method of producing a fluoropolymer according to the invention comprises polymerizing a radical polymerizable monomer in a defined reaction-field.

The defined reaction-field mentioned above is a supercriticality-expression state.

The term "supercriticality-expression state" as used in this specification means any of the following state (1), state (2), and state (3).

(1) In the case of a monocomponent system, a state transcending both the critical pressure $P_c^{mono}$ and critical temperature $T_c^{mono}$ of the radical polymerizable monomer involved.

As used in this specification, the term "monocomponent system" means a reaction field in which only one species of the radical polymerizable monomer is present.

(2) In the case of a multicomponent system involving two or more species of the radical polymerizable monomer, a state transcending both the lowest of the critical pressures and the lowest of the critical temperatures, each parameter independently taken, of the radical polymerizable monomers present in the reaction field. Assuming, for example, that vinylidene fluoride (VdF, critical pressure (Pc)=4.430 MPa, critical temperature (Tc)=30.15° C.) and hexafluoropropylene (HFP, Pc=2.900 MPa, Tc=93.95° C.) are used as two species of said radical polymerizable monomer, it means a state transcending 2.900 MPa, which is the critical pressure of HFP, and 30.15° C., which is the critical temperature of VdF (for example, Pc=3.5 MPa and Tc=50° C.).

(3) In the case of a multicomponent system, a state (3-1) transcending both the critical pressure $P_c^{mlt-mix}$ and critical temperature $T_c^{mlt-mix}$ of the whole mixture of dominant components present in a reaction field or a state (3-2) in which the partial pressure $P^{mlt-a}$ of an arbitrary component "a" among the dominant components present in a reaction field transcends the critical pressure $P_c^{mlt-a}$ and the temperature T of the reaction field transcends the critical temperature $T_c^{mlt-a}$, the above critical pressure $P_c^{mlt-a}$ and critical temperature $T_c^{mlt-a}$ correspond respectively to the critical pressure and the critical temperature of the component "a" assumingly present exclusively in the reaction field.

In this specification, the term "multicomponent system" means a reaction field involving at least one species of said radical polymerizable monomer and at least one species of dominant component other than said at least one species of radical polymerizable monomer. In the multicomponent system mentioned above, said radical polymerizable monomer may consist of a plurality of species.

The dominant component referred to above consists of said radical polymerizable monomer and the optionally-used non-ethylenic fluorocarbon and carbon dioxide which will be described hereinafter. In regard of the manner of counting the kinds or species of said dominant component, it is to be understood that, for instance, when the number of species of said radical polymerizable monomer present is 2 in substantial absence of said non-ethylenic fluorocarbon and carbon dioxide the number is counted as 2.

As referred to throughout this specification, the state (1) and state (3-1) mentioned above are supercritical states.

The state (3-1), when the multicomponent system consists of 2 or more species of radical polymerizable monomer, may include a state overlapping said state (2) in the sense that the pressure and temperature of the state (3-1) may coincide with the pressure and temperature defined as to said state (2).

The state (3-2) mentioned above is, when the multicomponent system consists of 2 or more species of radical polymerizable monomer, conceptually subsumed in said state (2) in the sense that the definition of the state (3-2) is a coincidence falling into said state (2).

The polymerization of said radical polymerizable monomer is preferably conducted in state (1) or state (3) among the above-mentioned states (1), (2) and (3).

In this specification, said critical pressure $P_c^{mono}$, said critical pressure $P_c^{mlt-mix}$, and said critical pressure $P_c^{mlt-a}$ are, when these are not mentioned distinctively, referred to as the term "supercriticality-expression pressure" and said critical temperature $T_c^{mono}$, critical temperature $T_c^{mlt-mix}$, and critical temperature $T_c^{mlt-a}$ are, when these are not mentioned distinctively, referred to as the term "supercriticality-expression temperature."

The state transcending both of said supercriticality-expression pressure and said supercriticality-expression temperature may be regarded as said supercriticality-expression state.

In the aforementioned defined reaction-field, substances other than said dominant component may be present. The substances other than the dominant component, mentioned just above, are not particularly restricted but include a radical polymerization initiator, a diluent for the radical polymerization initiator, and a chain transfer agent which will be described hereinafter. The substances other than said dominant component are trace components. Such trace components are proportionally so small that the influence thereof, if any, on the supercriticality-expression temperature and supercriticality-expression pressure of the reaction field is almost negligible and it is, therefore, assumed that, in the method of producing a fluoropolymer according to the invention, neither said supercriticality-expression temperature nor said supercriticality-expression pressure will be thereby affected.

Referring to the method of producing a fluoropolymer according to the invention in a multicomponent system, the critical pressure $P_c^{mlt-mix}$ and critical temperature $T_c^{mlt-mix}$ may be depressed or elevated from the monocomponent system critical pressure $P_c^{mlt-a}$ and critical temperature $T_c^{mlt-a}$, but as far as the present method of producing a fluoropolymer is concerned, it suffices that the $P_c^{mlt-mix}$ and $T_c^{mlt-mix}$ are not below the supercriticality-expression pressure and supercriticality-expression temperature in the actual reaction field.

Whether a reaction field is in the so-called supercriticality-expression state relevant to the method of producing a fluoropolymer according to the invention can be ascertained by measuring the pressure-density-temperature relations in the saturated state and one-phase region of the system to be measured (PVT measurement). However, when it is difficult to obtain measurement values, the estimated values (Chemical Handbook, Fundamentals Section, 5th revised edition, p. 6, ed. by the Chemical Society of Japan, Maruzen (Mar. 15, 1995) may be substituted.

In the method of producing a fluoropolymer according to the invention, the polymerization of said radical polymerizable monomer is carried out in said defined reaction-field by introducing the corresponding monomer gas.

In the method of producing a fluoropolymer according to the invention, said defined reaction-field is a reaction field which is in said supercriticality-expression state and, in addition, such that the monomer density (briefly, $\rho_m$)–monomer critical density (briefly, $\rho_0$) ratio (i.e. $\rho_m/\rho_0$; hereinafter referred to as $\rho_m/\rho_0 = \rho_r$) is not less than 1.1. If the $\rho_r$ value is less than 1.1, the polymerization will be retarded to detract from productivity in a significant measure. The preferred upper limit of $\rho_r$ is 1.8, the more preferred upper limit is 1.7, and the still more preferred upper limit is 1.6.

The monomer density mentioned above is the density of the radical polymerizable monomer, and the radical polymerizable monomer is usually a gas at an ordinary temperature of about 25–30° C. prior to charging. In cases where 2 or more species of radical polymerizable monomer are involved, said monomer density is the sum total of the respective densities of the radical polymerizable monomers. The monomer density mentioned above is determined by dividing the charge amount of radical polymerizable monomer by the internal volume of the reaction vessel.

The "monomer critical density $\rho_0$" relevant to the method of producing a fluoropolymer according to the present invention means a monomer density at the supercriticality-expression temperature and supercriticality-expression pressure. The lower limit of said $\rho_0$ is preferably 0.3 g/ml.

In the method of producing a fluoropolymer according to the invention, said radical polymerizable monomer comprises a fluorine-containing ethylenic monomer.

The radical polymerizable monomer which can be used in the invention includes (i) one species of fluorine-containing ethylenic monomer,
(ii) a mixture of two or more species of fluorine-containing ethylenic monomer
(iii) a mixture of one species of fluorine-containing ethylenic monomer and one or more species of fluorine-free ethylenic monomer, and
(iv) a mixture of two or more species of fluorine-containing ethylenic monomer and one or more species of fluorine-free ethylenic monomers.

The fluorine-containing ethylenic monomer mentioned above includes perfluoroethylenic monomers such as tetrafluoroethylene [TFE], chlorotrifluoroethylene [CTFE], hexafluoropropylene [HFP], perfluoro(alkyl vinyl ether) [PAVE],

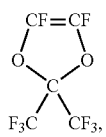

etc.; and hydrogen-containing fluoroethylenic monomers such as vinylidene fluoride [VdF], trifluoroethylene, vinyl fluoride, trifluoropropylene, pentafluoropropylene, tetrafluoropropylene, hexafluoroisobutene, and so forth. PAVE, mentioned above, includes perfluoro (methyl vinyl ether) [PMVE], perfluoro(ethyl vinyl ether) [PEVE] and perfluoro (propyl vinyl ether) [PPVE], among others.

It is especially preferable that the fluorine-containing ethylenic monomer mentioned above comprises VdF in the sense that it may readily attain the supercriticality-expression state at comparatively low temperature and low pressure, it does not have self-polymerizability, and it can be handled safely. The above fluorine-containing ethylenic monomer preferably comprises VdF and at least one member selected from among TFE, HFP and CTFE, for an improved extrudability may then be expected in the extrusion molding of the product fluoropolymer.

As the above fluorine-containing ethylenic monomer, a functional-group-containing fluoroolefin can also be used. The functional-group-containing fluoroolefin is not particularly restricted but includes the compound which may be represented by the following formula:

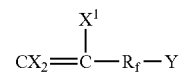

(wherein Y represents —CH$_2$OH, —COOH, —SO$_2$F, —SO$_3$M (M=hydrogen, NH$_4$, or an alkali metal), a carboxyl group in the form of a salt, an esterified carboxyl group, an epoxy group, or a nitrile group; X and $X^1$ are the same or different and each represents hydrogen or fluorine; $R_f$ represents a fluorine-containing alkylene group having 1–40 carbon atoms or a fluorine-containing alkylene group having an ether bond and 1–40 carbon atoms).

The compound mentioned just above specifically includes but is not limited to:

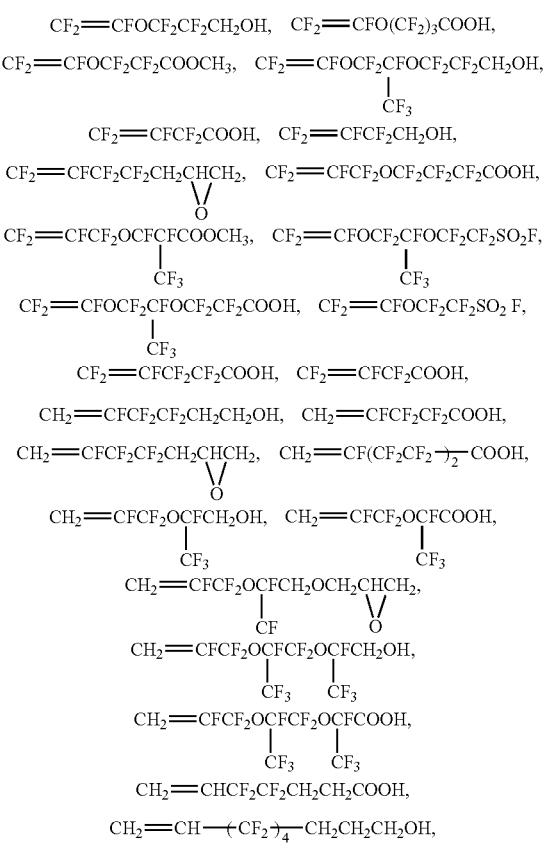

-continued

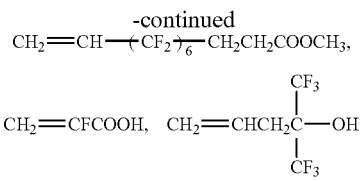

As said fluorine-containing ethylenic monomer, it is also possible to use an iodine-containing monomer, for example the perfluorovinylether iodides disclosed in JP Kokoku Publication H05-63482 and JP Kokai S62-12734, such as perfluoro(6,6-dihydro-6-iodo-3-oxa-1-hexene), perfluoro(5-iodo-3-oxa-1-pentene), and so forth.

The fluorine-free ethylenic monomer is not particularly restricted but includes α-olefin monomers of 2–10 carbon atoms, such as ethylene [ET], propylene, butene, pentene, etc.; and alkyl vinyl ethers each having an alkyl moiety of 1–20 carbon atoms, such as methyl vinyl ether, ethyl vinyl ether, propyl vinyl ether, cyclohexyl vinyl ether, hydroxybutyl vinyl ether, butyl vinyl ether, and so forth.

In the polymerization in a reaction field in supercriticality-expression state the following combinations of radical polymerizable monomer species are particularly preferred.

(a) Homopolymerization of one species, e.g. VdF, TFE, CTFE or the like;
(b) copolymerization of VdF and HFP (molar ratio: 50~99/1~50);
(c) copolymerization of VdF, HFP and TFE (molar ratio: 50~98/1~40/1~40);
(d) copolymerization of HFP and ET (molar ratio: 1~50/50~99);
(e) copolymerization of HFP, ET and TFE (molar ratio: 1~50/40~98/1~45);
(f) copolymerization of PAVE and TFE (molar ratio: 1~50/50~99);
(g) copolymerization of TFE and HFP (molar ratio: 50~99/1~50);
(h) copolymerization of TFE and ET (molar ratio: 1~99/1~99);
(i) copolymerization of TFE and propylene (molar ratio: 1~99/1~99);
(j) copolymerization of VdF and TFE (molar ratio: 1~99/1~99);
(k) copolymerization of VdF and CTFE (molar ratio: 1~99/1~99);
(l) copolymerization of VdF, CTFE and TFE (molar ratio: 50~98/1~30/1~30);
(m) copolymerization of TFE, VdF and propylene (molar ratio: 30~98/1~50/1~50);
(n) copolymerization of ET, HFP and VdF (molar ratio: 10~85/10~45/1~45);
(o) copolymerization of ET, HFP, VdF and TFE (molar ratio: 10~85/10~45/1~45/1~30).

In the method of producing a fluoropolymer according to the invention, a non-ethylenic fluorocarbon and/or carbon dioxide may be allowed to be present in the reaction field. The non-ethylenic fluorocarbon mentioned just above includes hydrofluorocarbons, such as pentafluoroethane, tetrafluoroethane, trifluoroethane, trifluoromethane, difluoromethane, etc.; and perfluorocarbons, such as perfluoroethane, perfluorocyclobutane, etc., among others. The carbon dioxide or said non-ethylenic fluorocarbon, referred to above, acts as a diluent for the radical polymerizable monomer in the reaction field to assist in removal of the heat of reaction and contribute to improved solubility of the radical polymerization initiator and stability of product fluoropolymer particles in the reaction field.

The non-ethylenic fluorocarbon, if used, is preferably used in a proportion of 1–500 mass % relative to the total amount of said radical polymerizable monomer. Excessive use would undesirably increase the amount of non-ethylenic fluorocarbon that should be recovered after the reaction. The more preferred upper limit is 300 mass % and the still more preferred upper limit is 200 mass %.

In the method of producing a fluoropolymer according to the invention, water may be concomitantly present in the reaction field but a substantially anhydrous reaction-field is preferred for simplification of the procedures necessary for purification of the object fluoropolymer and recovery of the unreacted material.

In the method of producing a fluoropolymer according to the invention, a chain transfer agent may also be added for controlling the molecular weight of the objective fluoropolymer.

The chain transfer agent referred to above includes not only hydrocarbons and halogenated hydrocarbons but also alcohols (hydrocarbon-based), esters (hydrocarbon-based), ketones (hydrocarbon-based), and mercaptans.

The hydrocarbons mentioned just above include hydrocarbons of 4–6 carbon atoms, such as pentane, butane, and hexane. The halogenated hydrocarbons include tetrachloromethane, chloroform, and methylene chloride, among others. The halogenated hydrocarbons mentioned above are different from said non-ethylenic fluorocarbons in that the latter compounds substantially do not have chain transfer function.

The alcohols (hydrocarbon-based) include methanol, ethanol, and isopropyl alcohol, among others. The esters (hydrocarbon-based) include methyl acetate, ethyl acetate, butyl acetate, ethyl propionate, ethyl acetoacetate, dimethyl malonate, diethyl malonate, dimethyl succinate, diethyl succinate, and diethyl carbonate, among others.

The ketones (hydrocarbon-based) include acetone, acetylacetone, cyclohexanone, and so forth. Among said mercaptans is dodecylmercaptan.

Among these, pentane, butane, isopropyl alcohol, diethyl malonate, tetrachloromethane, acetone, and dodecylmercaptan are preferred because drastic decreases in the molecular weight may be attained at low levels of addition.

The formulating amount of said chain transfer agent can be judiciously selected according to the desired molecular weight of fluoropolymer but the usually preferred level is 0.001–5 mass % relative to the total amount of said radical polymerizable monomer. The more preferred lower limit is 0.1 mass % and the more preferred upper limit is 2 mass %.

In the method of producing a fluoropolymer according to the invention, the polymerization of said radical polymerizable monomer is carried out in a reaction field in supercriticality-expression state.

The method of bringing a reaction field into such supercriticality-expression state includes: (1) the method (batchwise mode) which comprises charging under pressure a pressure-resisting polymerization vessel with the radical polymerizable monomer optionally together with said non-ethylenic fluorocarbon and/or carbon dioxide and increasing the temperature to not less than supercriticality-expression temperature to bring the pressure to not less than supercriticality-expression pressure and thereby establish said supercriticality-expression state and (2) the method (continuous mode) which comprises feeding said radical polymerizable monomer optionally together with said non-ethylenic fluorocarbon and/or carbon dioxide continuously to a pressure-resisting polymerization vessel the interior of which has been adjusted to not less than the supercriticality-expression pressure and to not less than supercriticality-expression temperature and thereby establish said supercriticality-expression state. The polymerization can be carried out in whichever of the batch, semi-batch, and continuous modes but the batchwise polymerization method is preferred.

For reference's sake, the critical pressure (Pc) and critical temperature (Tc) values of some representative radical polymerizable monomers and non-ethylenic fluorocarbons are shown below.

| Monomer and other substance nomenclature | Pc(MPa) | Tc(K) | Reference |
|---|---|---|---|
| VdF | 4.430 | 303.30 | 1 |
| HFP | 2.900 | 367.10 | 2 |
| TFE | 3.940 | 306.00 | 3 |
| CTFE | 3.96 | 379.00 | 4 |
| PMVE | 2.803 | 362.33 | 5 |
| PEVE | 2.266 | 394.67 | 5 |
| PPVE | 1.901 | 423.51 | 5 |
| ET | 5.041 | 282.34 | 6 |
| Propylenefluorocarbon | 4.600 | 364.90 | 6 |
| Perfluoromethane | 3.745 | 227.51 | 7 |
| Trifluoromethane | 4.836 | 398.97 | 7 |
| Difluoromethane | 5.830 | 351.55 | 8 |
| Perfluoroethane | 3.043 | 293.03 | 9 |
| 1,1,1,2-Tetrafluoroethane | 4.056 | 374.18 | 10 |
| 1,1,1-Trifluoroethane | 3.765 | 345.75 | 11 |
| 1,1-Difluoroethane | 4.516 | 386.41 | 7 |
| Perfluorocyclobutane | 2.773 | 388.37 | 12 |

The literature index is as follows.
1: Riddick, J. A., Bunger, W. B., Sakano, T. K., "Organic Solvents: Physical Properties and Methods of Purification," 4th Ed., Wiley Interscience, New York (1986).
2: Matheson Company, Inc., "Matheson Gas Data Book" unabridged ed., 4 vols., East Rutherford, N.J. (1974).
3: Weiss, G., "Hazardous Chemicals Data Book" Noyes Data Corp. Park Ridge, N.J. (1986).
4: Engineering Sciences Data, Item 91006, "Vapor Pressures and Critical Points of Liquids. Halogenated Ethylenes, " ESDU, London April (1991).
5: Estimation (Lydersen method)
6: Tsonopoulos, C., Ambrose, D., "Vapor-Liquid Critical Properties of Elements and Compounds. 6. Unsaturated Aliphatic Hydrocarbons" J. Chem. Eng. Data 41, 645 (1996).
7: Thermodynamics Research Center, "TRC Thermodynamic Tables, Non-Hydrocarbons" The Texas A&M University System, College Station, Tex. (1996).
8: Gross, U., Song, Y. W., "Thermal Conductivities of New Refrigerants R125 and R32 Measured by the Transient Hot-Wire Method" Int. J. Thermophys. 17(3), 607 (1996).
9: Wilson, L. C., Wilding, W. V., Wilson, H. L., Wilson, G. M., "Critical Point Measurements by a New Flow Method and a Traditional Static Method" J. Chem. Eng. Data 40, 765 (1995).
10: McLinden, M. O., Huber, M. L., Outcalt, S. L., "Thermophysical Properties of Alternative Refrigerants: Status of the HFCs" ASME Vinter Annual Meeting, New Orleans, La.—Nov. 28 (1993).
11: Nagel, Bier, K., Int. J. Refrigeration 19(4), 264 (1996).
12: Thermodynamics Research Center, "Selected Values of Properties of Chemical Compounds " Data Project, Texas A&M University, College Station, Tex. (1983).

The polymerization conditions for use in the method of producing a fluoropolymer according to the invention are dependent on the conditions required for establishing a supercriticality-expression state and, as such, are not restricted, but within the range transcending the supercriticality-expression pressure and supercriticality-expression temperature, it is preferable to select a condition somewhat close to the supercriticality-expression pressure and supercriticality-expression temperature for improved energy efficiency and reduced equipment cost. For example, the polymerization pressure may range from 2 to 40 MPa, the more preferred lower limit being 4 MPa and the more preferred upper limit being 10 MPa, and the polymerization temperature may range from the supercriticality-expression temperature of the monomer to 200° C., preferably from said supercriticality-expression temperature to 150° C. The above lower limit of polymerization temperature, taking VdF as an example of the monomer to be used, is preferably 30.15° C. which is the critical temperature of VdF and more preferably 31° C. in the sense that the reaction field may then be persistently maintained in supercriticality-expression state. This lower-limit temperature is preferably higher by a few degrees ° C. than the supercriticality-expression temperature because the monomer used hardly undergoes liquefaction at such a temperature and from the viewpoint of equipment operation. The polymerization time is about 0.1–50 hours. Use of high temperatures and high pressures far transcending the supercriticality-expression pressure and supercriticality-expression temperature could add to the reaction plant cost.

In the method of producing a fluoropolymer according to the invention, said defined reaction-field is in a supercriticality-expression state and more preferably such that its pressure is not higher than 40 MPa and its temperature is not higher than the temperature which transcends the supercriticality-expression temperature of said defined reaction-field by 100° C.

In the method of producing a fluoropolymer according to the invention, the polymerizing said radical polymerizable monomer is usually conducted in the presence of a radical polymerization initiator. The radical polymerization initiator which can be used includes peroxides, namely organic peroxides and inorganic peroxides, and azo compounds, among others.

The organic peroxides are not particularly restricted but the following compounds may be mentioned by way of illustration: isobutyl peroxide, 3,5,5-trimethylhexanoyl peroxide, octanoyl peroxide, lauroyl peroxide, stearoyl peroxide, succinoyl peroxide, diacyl peroxides, e.g. bis(ω-hydrododecafluoroheptanoyl) peroxide; peroxydicarbonates such as di-n-propyl peroxydicarbonate; diisopropyl peroxydicarbonate, bis(4-t-butylcyclohexyl) peroxydicarbonate, di-2-ethoxyethyl peroxydicarbonate, di-2-ethylhexyl peroxydicarbonate, di-2-methoxybutyl peroxydicarbonate, diethyl peroxydicarbonate, etc.; and peroxy-esters such as 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, t-butyl peroxyisobutyrate, t-hexyl peroxyisopropylmonocarbonate, t-butyl peroxy-3,5,5-trimethylhexanoate, t-butyl peroxylaurate, t-butyl peroxyisopropylmonocarbonate, t-butyl peroxy-2-ethylhexylmonocarbonate, t-butyl peroxyacetate, and so forth.

The inorganic peroxides are not particularly restricted but hydrogen peroxide, persulfates, etc. can be mentioned.

The persulfates are not particularly restricted but ammonium persulfate, sodium persulfate, potassium persulfate, etc. can be mentioned.

The organic peroxides and inorganic peroxides, when chosen, may be used in combination with a reducing agent.

The azo compounds mentioned above are not particularly restricted but the following compounds can be mentioned by way of illustration: cyano-2-propylazoformamide, 1,1'-azobis(cyclohexane-1-carbonitrile), 2,2'-azobis(2-amidinopropane) dihydrochloride, 2,2'-azobis(2-methylbutyronitrile), 2,2'-azobisisobutyronitrile, 2,2'-azobis(2,4-dimethylvaleronitrile), 2,2'-azobis[N-(2-propenyl)-2-methylpropionamide], polydimethylsiloxane segment-containing macroazo compound, 2,2'-azobis(2,4,4-trimethylpentane), 2,2'-azobis(4-methoxy-2,4-dimethylvaleronitrile), 4,4'-azobis(4-cyanovaleric acid), dimethyl 2,2'-azobisisobutyrate, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-(1,1-bis(hydroxymethyl)ethyl)propionamide}, 2,2'-azobis[2-methyl-N-(2-hydroxyethyl)propionamide], 2,2'-azobisisobutyramide dihydrate, 2,2'-azobis[2-(hydroxymethyl)propionitrile], and so forth.

Among the radical polymerization initiators mentioned above, organic peroxides are preferred because their vapor pressures are low and does not result unstable fluoropolymer-terminus. Furthermore, in view of the ease of dissolving in said dominant component in a supercriticality-expression state peroxydicarbonates are preferred.

The radical polymerization initiator mentioned above preferably accounts for 0.001–10 mass % based on the total amount of the radical polymerizable monomer. If the proportion of the radical polymerization initiator is smaller than 0.001 mass %, it may happen that no polymerization takes place, a marked decrease in productivity may take place, or a fluoropolymer with a super-high molecular weight will form to cause poor molding. If 10 mass % is exceeded, the molecular weight tends to be drastically decreased and fail to attain the objective value, with the proneness that the cost of the radical polymerization initiator is increased and the strength of moldings reduced. The more preferred lower limit is 0.005 mass % and the more preferred upper limit is 2 mass %.

Furthermore, in the present invention, other additives may also be added provided that the reaction is not thereby affected. Such other additives are not particularly restricted but include a diluent for said radical polymerization initiator (e.g. diethyl carbonate, perfluorohexane, 2,2,3,3-tetrafluoropropylene alcohol or the like).

By the method of producing a fluoropolymer according to the invention, a fluoropolymer comprising the above radical polymerizable monomer as a constituent unit can be produced. The fluoropolymer may be a resin or an elastomer.

The fluoropolymer which can be produced by the method of producing a fluoropolymer according to the invention is not restricted. For example, the resin mentioned above includes polytetrafluoroethylene [PTFE], polyvinylidene fluoride [PVdF], polychlorotrifluoroethylene [PCTFE], VdF/TFE copolymer, VdF/TFE/CTFE copolymer, TFE/HFP copolymer [FEP; HFP content≦30 mol %], and TFE/PAVE copolymer [PFA; PAVE content ≦20 mol %], among others. The elastomer mentioned above includes VdF/HFP copolymer, VdF/HFP/TFE copolymer, HFP/ET copolymer, HFP/ET/TFE copolymer, HFP/ET/VdF copolymer, HFP/ET/VdF/TFE copolymer, TFE/PAVE copolymer (PAVE content=21~50 mol %), TFE/HFP copolymer (HFP content=31~50 mol %), TFE/propylene copolymer, VdF/CTFE copolymer, and TFE/VdF/propylene copolymer, among others.

BEST MODE FOR CARRYING OUT THE INVENTION

The following examples are further illustrative of the invention but should by no means be construed as defining the scope of the invention.

Average Polymerization Rate [$R_p$]

The polymerization is conducted in a reaction vessel of known internal volume and the weight of the fluoropolymer produced in one hour is determined. This fluoropolymer weight is divided by the internal volume of the reaction vessel to arrive at the average polymerization rate [$R_p$].

EXAMPLE 1

A stainless steel autoclave with an internal volume of 1,083 ml was subjected to sufficient nitrogen purging and then charged with 542 g of vinyl idene fluoride (VdF, monomer critical density $\rho_0$=0.417 g/ml) in vacuo using a high-pressure plunger pump to establish a monomer density $\rho_m$ of 0.50 g/ml. Using a band heater, the temperature of the reaction field (reaction temperature) was raised to 40° C., whereupon the pressure of the reaction field became 5.72 MPa.

Then, using a syringe pump, 6.1 g of a 50% solution in methanol of di-n-propyl peroxydicarbonate (product of Nippon Oils and Fats, Peroyl NPP) as said organic peroxide series radical polymerization initiator was introduced into the reaction field under nitrogen pressure. Then, under stirring internally with a solenoid stirrer, the reaction was carried out for an hour. The pressure of the reaction field was 5.72 MPa and the temperature thereof was 40° C. The pressure and temperature conditions of the reaction field were higher than the critical pressure (4.430 MPa) prevailing in the presence of VdF alone and the critical temperature (30.15° C.) prevailing in the presence of VdF alone, respectively, thus constituting a reaction field in supercritical state as the term is used in the present invention.

After completion of the reaction, the unreacted radical polymerizable monomer was released into the atmosphere and the resulting solid product was dried in vacuo at 60° C. for 15 hours to recover 29.5 g of white-colored fluoropolymer A. Therefore, the average polymerization rate [$R_p$] was 27.2 g/(litter·hour).

Analysis of the above white-colored fluoropolymer A by size-exclusion chromatography [SEC] revealed that, on a polystyrene equivalent basis, the number average molecular weight was [Mn]=36,080 and the weight average molecular weight was [Mw]=78,050.

EXAMPLE 2

A stainless steel autoclave with an internal volume of 1,083 ml was subjected to sufficient nitrogen purging and then charged with 639 g of VdF in vacuo using a high-pressure plunger pump to establish a monomer density $\rho_m$ of 0.59 g/ml. Using a band heater, the temperature of the reaction field (reaction temperature) was raised to 40° C., whereupon the pressure of the reaction field became 6.62 MPa.

Then, using a syringe pump, 6.1 g of a 50% solution in methanol of di-n-propyl peroxydicarbonate as said organic peroxide series radical polymerization initiator was introduced into the reaction field under nitrogen pressure. Then, under stirring internally with a solenoid stirrer, the reaction was carried out for an hour. The pressure of the reaction field was 6.62 MPa and the temperature thereof was 40° C. The pressure and temperature of the reaction field were higher than the critical pressure of VdF alone and the critical temperature of VdF alone, respectively, thus constituting a reaction field in supercritical state as the term is used in the present invention.

After completion of the reaction, the unreacted monomer was released into the atmosphere and the resulting solid product was dried in vacuo at 60° C. for 15 hours to recover 54.6 g of white-colored fluoropolymer B. Therefore, $[R_p]$ was 50.4 g/(litter·hour).

Analysis of the above white-colored fluoropolymer B by SEC revealed that, on a polystyrene equivalent basis, Mn was 54,900 and Mw was 118,500.

COMPARATIVE EXAMPLE 1

A stainless steel autoclave with an internal volume of 1,083 ml was subjected to sufficient nitrogen purging and then charged with 314 g of VdF in vacuo using a high-pressure plunger pump to establish a monomer density $\rho_m$ of 0.29 g/ml. Using a band heater, the temperature of the reaction field (reaction temperature) was raised to 40° C., whereupon the pressure of the reaction field became 5.13 MPa.

Then, using a syringe pump, 6.1 g of a 50% solution in methanol of di-n-propyl peroxydicarbonate as said organic peroxide series radical polymerization initiator was introduced into the reaction field under nitrogen pressure. Then, under stirring internally with a solenoid stirrer, the reaction was carried out for an hour. The pressure of the reaction field was 5.13 MPa and the temperature thereof was 40° C. The pressure and temperature of the reaction field were higher than the critical pressure of VdF alone and the critical temperature of VdF alone, respectively, thus constituting a reaction field in supercritical state as the term is used in the present invention.

After completion of the reaction, the unreacted radical polymerizable monomer was released into the atmosphere and the resulting solid product was dried in vacuo at 60° C. for 15 hours to recover 8.88 g of white-colored fluoropolymer C. Therefore, $[R_p]$ was 8.2 g/(litter·hour).

Analysis of the above white-colored fluoropolymer C by SEC revealed that, on a polystyrene equivalent basis, Mn was 8,560 and Mw was 14,700.

COMPARATIVE EXAMPLE 2

A stainless steel autoclave with an internal volume of 1,083 ml was subjected to sufficient nitrogen purging and then charged with 433 g of VdF in vacuo using a high-pressure plunger pump to establish a monomer density $\rho_m$ of 0.40 g/ml. Using a band heater, the temperature of the reaction field (reaction temperature) was raised to 40° C., whereupon the pressure of the reaction field became 5.35 MPa.

Then, 6.1 g of a 50% solution, in methanol of di-n-propyl peroxydicarbonate (product of Nippon Oils and Fats, Peroyl NPP) as said organic peroxide series radical polymerization initiator was introduced into the reaction field under nitrogen pressure. Then, under stirring internally with a solenoid stirrer, the reaction was carried out for an hour. The pressure of the reaction field was 5.35 MPa and the temperature thereof was 40° C. The pressure and temperature of the reaction field were higher than the critical pressure of VdF alone and the critical temperature of VdF alone, respectively, thus constituting a reaction field in supercritical state as the term is used in the present invention.

After completion of the reaction, the unreacted radical polymerizable monomer was released into the atmosphere and the resulting solid product was dried in vacuo at 60° C. for 15 hours to recover 10.18 g of white-colored fluoropolymer D. Therefore, $[R_p]$ was 9.4 g/(litter·hour).

Analysis of the above white-colored fluoropolymer D by SEC revealed that, on a polystyrene equivalent basis, Mn was 11,600 and Mw was 19,700.

INDUSTRIAL APPLICABILITY

By the method of producing a fluoropolymer according to the invention, constituted as above, fluoropolymers can be produced at dramatically high polymerization rates under comparatively low temperature and low pressure conditions conducive to savings in commercial production plant cost and, hence, provide for dramatically improved productivity.

The invention claimed is:

1. A method of producing a fluoropolymer
   which comprises polymerizing a radical polymerizable monomer in a defined reaction-field in absence of carbon dioxide,
   wherein said radical polymerizable monomer comprises a fluorine-containing ethylenic monomer,
   said defined reaction-field is in a supercriticality-expression state with a monomer density $[\rho_m]$-monomer critical density $[\rho_0]$ ratio $[\rho_m]/[\rho_0]$ of not less than 1.1.

2. The method of producing a fluoropolymer according to claim 1
   wherein said defined reaction-field is further characterized in that its pressure is not higher than 40 MPa and its temperature is not higher than a temperature exceeding a supercriticality-expression temperature of the defined reaction-field by 100° C.

3. The method of producing a fluoropolymer according to claim 1
   wherein the fluorine-containing ethylenic monomer comprises vinylidene fluoride.

4. The method of producing a fluoropolymer according to claim 3 (wherein the fluorine-containing ethylenic monomer further comprises at least one member selected from the group consisting of tetrafluoroethylene, chlorotrifluoroethylene and hexafluoropropylene.

5. The method of producing a fluoropolymer according to claim 1
   wherein polymerizing the radical polymerizable monomer is conducted in the presence of a radical polymerization initiator.

6. The method of producing a fluoropolymer according to claim 5
   wherein the radical polymerization initiator is an organic peroxide.

7. The method of producing a fluoropolymer according to claim 6
   wherein the organic peroxide is a peroxydicarbonate.

* * * * *